United States Patent [19]

Full et al.

[11] 4,302,814
[45] Nov. 24, 1981

[54] RELATIVE EXHAUST BACK-PRESSURE OF AN INTERNAL COMBUSTION ENGINE

[75] Inventors: Gary G. Full, Ellington; Rinaldo R. Tedeschi, Newington, both of Conn.

[73] Assignee: United Technologies Corporation, Hartford, Conn.

[21] Appl. No.: 105,446

[22] Filed: Dec. 20, 1979

[51] Int. Cl.³ .............................................. G01L 3/26
[52] U.S. Cl. .................................. 364/551; 73/116; 364/431
[58] Field of Search ................... 364/424, 551, 431; 73/112, 116, 117.2, 117.3, 118; 123/440, 393, 437

[56] References Cited
U.S. PATENT DOCUMENTS

| | | | |
|---|---|---|---|
| 4,050,296 | 9/1977 | Benedict | 73/116 |
| 4,133,205 | 1/1979 | Hulls et al. | 364/551 |
| 4,179,922 | 12/1979 | Bouverie et al. | 364/551 |
| 4,194,471 | 3/1980 | Baresel | 123/440 |

Primary Examiner—Errol A. Krass
Attorney, Agent, or Firm—Dominic J. Chiantera

[57] ABSTRACT

The exhaust back-pressure of an internal combustion (IC) engine is used to provide an indication of the relative combustion efficiency of the engine's cylinders. The instantaneous values of back-pressure are sensed at selected, sub-cyclic crankshaft angular intervals, within a full engine cycle, each angle interval being substantially less than that associated with a cylinder sub-cycle, each sensed value of back-pressure being identified by the sensed angle position to provide an indication of the sub-cyclic fluctuation in back-pressure as they occur at known cylinder exhaust stroke cycles within the engine cycle, thereby providing identification of each sub-cyclic back-pressure pulse as being associated with a particular engine cylinder, the relative magnitudes of the back-pressure pulses being compared with each other to provide indices of the relative combustion efficiency of each cylinder.

7 Claims, 13 Drawing Figures

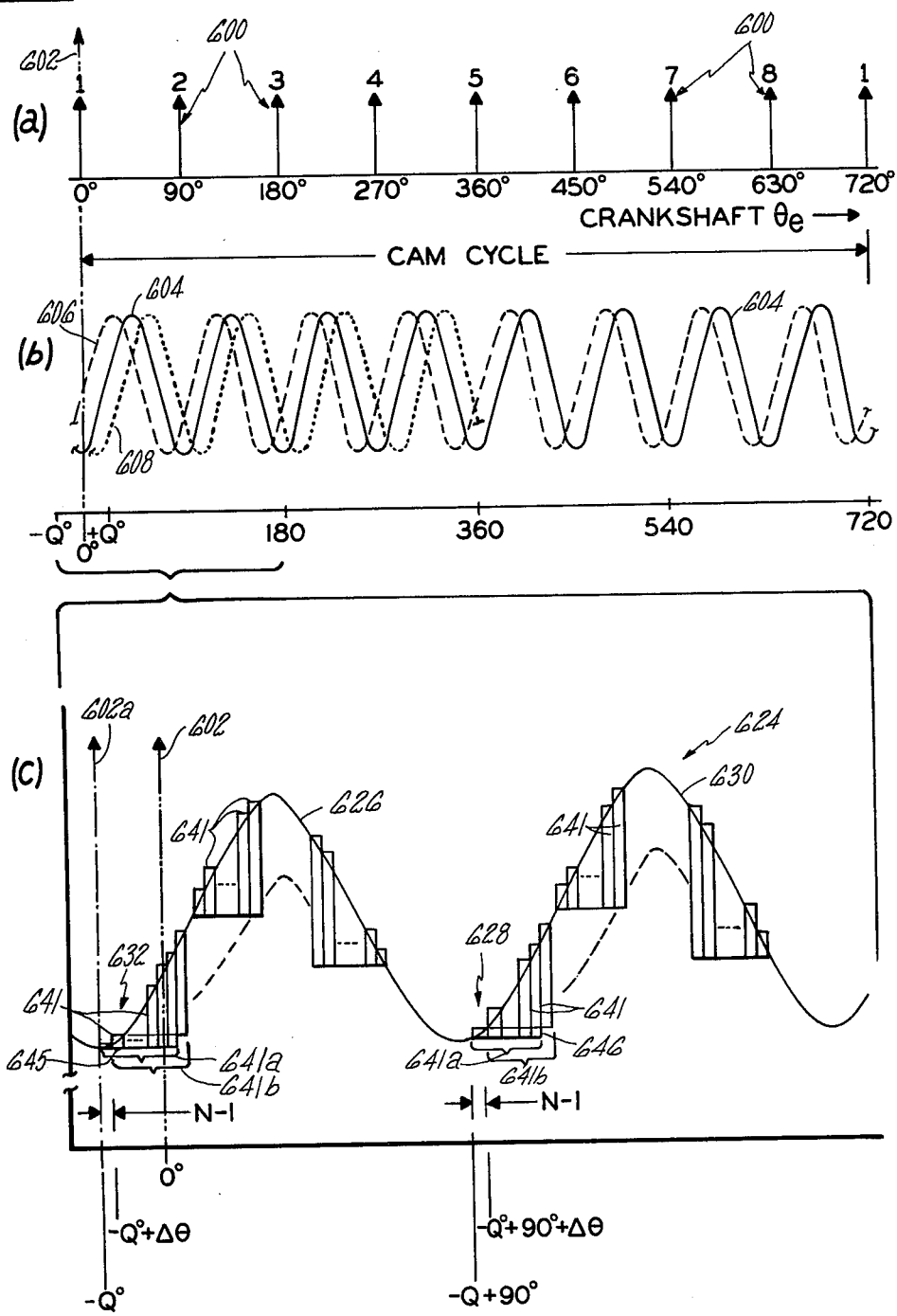

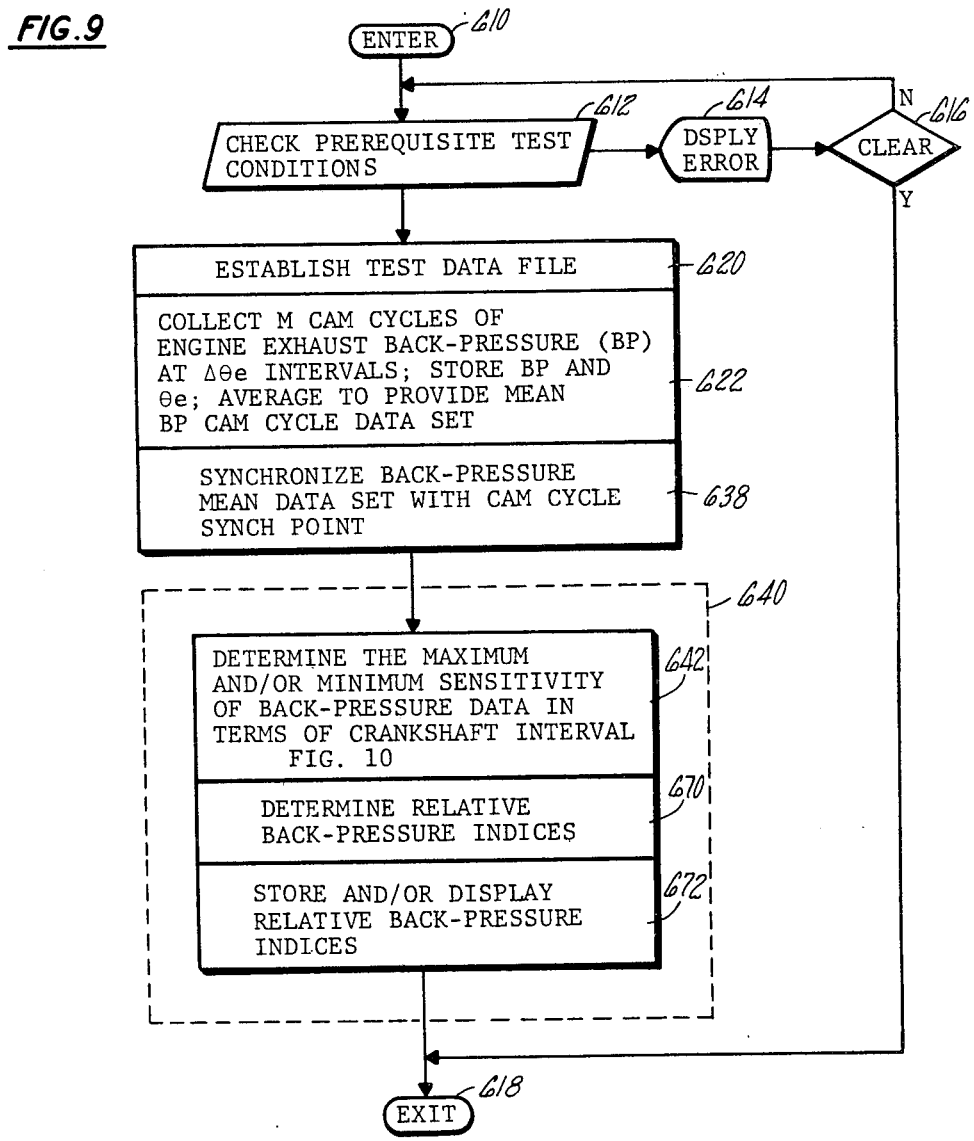

4,302,814

RELATIVE EXHAUST BACK-PRESSURE OF AN INTERNAL COMBUSTION ENGINE

DESCRIPTION

Technical Field

This invention relates to the extra-vehicular hot-testing of internal combustion (IC) engines, and more particularly to diagnosing hot-test engine performance electronically.

Background Art

Hot-testing of IC engines outside of a vehicle (extra-vehicular) is known generally, being used mainly in the testing of newly manufactured, production line engines and in the testing of overhauled or repaired engines. The term hot-test refers to testing the engine with ignition to determine basic dynamic engine performance. At present, the actual tests performed during the engine hot-test involve the most basic test criteria and rely almost entirely on the hot-test operator for diagnosing base-line engine performance. Although the tests may involve measurement of basic engine timing, in general the pass/fail acceptance standards are based on what the operator perceives of the engine running characteristics, such as the inability to start or to maintain engine speed, or the sound of the engine while running. These tests do provide suitable pass/fail criteria for gross engine malfunctions, however, it is impossible, except to the most experienced operator, to provide even simple diagnosis of the cause of the engine poor performance.

In the first instance, the inability to provide quantitative measurements of engine performance and acceptance, results in the acceptance of marginal engines in which the actual failure occurs sometime later as an infant mortality, perhaps after installation in the vehicle. Conversely, the rejection of an engine based on the present qualitative standards may be unwarranted in many instances, resulting in the unnecessary recycling of the engine through some type of repair facility, where with more extensive testing the apparent fault may be corrected with a minor engine adjustment. Therefore, it is desirable to establish an accurate quantitative analysis testing procedure which with measurement of selected engine parameters may provide for accurate pass/fail determination.

In the present state of the art of IC engine diagnostics, electronic analysis has provided superior quantitative test standards for measuring engine performance. In general the electronic analysis standards have been developed for testing vehicle mounted engines under test conditions which are of necessity less controlled than those potentially available in the hot-testing of engines. One test, however, which has been used in both vehicle mounted engines and for pass/fail acceptance of new or overhauled engines, involves the use of the engine's exhaust back-pressure as an indicator of engine performance. As known exhaust back-pressure is the pressure differential between the instantaneous pressure of the exhaust gas at the exhaust manifold and ambient. The engine exhaust is a composite of the individual cylinder's combustion residue and as such contains useful information of individual cylinder performance. At present the engine back-pressure is used to detect gross malfunctions in the engine, such as cylinder misfirings. In general the full cycle, or average back-pressure is sensed with a pickup sensor inserted in the exhaust manifold and the resultant pressure indications are displayed on a cathode ray tube (CRT). The sensed indications essentially appear as a DC waveform which is modulated with noise spikes resulting from the individual cylinder's firing. The presence or absence of these cylinder associated spikes is then used to determine a good or bad engine. Since the absence of a cylinder firing results in a significant reduction in the average back-pressure value such as to produce a markedly visible discontinuity in the waveform, the utility of the test is to verify the existence of a failure in the engine, as opposed to providing a performance indication of how good an engine is.

Another test involving the use of sensed back-pressure, which eliminates the visual observation, i.e. operator determination of a fault, is the use of a "back-fire" detector which in effect is a band-pass filter with limits established so as to detect the presence of the lower frequency exhaust components resulting from a cylinder loss, or misfire. Given engine test speed, with knowledge of the number of cylinders involved, the range of values of this lower frequency back-pressure component may be predicted and the back-fire detector band-pass limits thereby established.

Each of these tests use the average, or full cycle value of back-pressure to detect comparatively gross engine malfunctions by looking for the indications of such failures in the average back-pressure waveform. They provide verification of the existence of a fault but do not extract the information available in the engine back-pressure as to the overall health or the relative balance between the engine cylinders. As such the presence of more subtle defects which may result in potential failure of the engine following installation in a vehicle are not detected.

CROSS REFERENCE TO RELATED APPLICATIONS

Some of the subject matter disclosed and claimed herein is also disclosed in one or more of the following commonly owned, copending U.S. patent applications filed on even date herewith by: Full et al, Ser. No. 105,803, entitled RELATIVE MANIFOLD VACUUM OF AN INTERNAL COMBUSTION ENGINE; Tedeschi et al, Ser. No. 105,448, entitled SNAP ACCELERATION TEST FOR AN INTERNAL COMBUSTION ENGINE; Tedeschi et al, Ser. No. 105,680, entitled SPARK PLUG LOAD TESTING FOR AN INTERNAL COMBUSTION ENGINE: and Full et al, Ser. No. 105,447, entitled RELATIVE POWER CONTRIBUTION OF AN INTERNAL COMBUSTION ENGINE.

Disclosure of Invention

The object of the present invention is to use the exhaust back-pressure of an IC engine to provide a quantitative measurement of the relative combustion efficiency between cylinders of the engine.

According to the present invention, the contribution of each cylinder in an IC engine to the sub-cyclic fluctuations in engine exhaust back-pressure are measured and the individual cylinder contributions compared to that of each other cylinder to provide as an indication of relative combustion efficiency. In further accord with the present invention, the instantaneous values of engine exhaust back-pressure are sensed at selected, equal crankshaft angular intervals, each angular interval being substantially smaller than that associated with a cylinder's sub-cycle, the sensed instantaneous back-pressure information being synchronized with each cam cycle such that each sensed sub-cycle fluctuation in back-pressure may be identified as associated with a particular one of the cylinders exhaust stroke in the cycle thereby providing correlation of the sub-cyclic back-pressure pulse with a particular engine cylinder, the pulse magnitudes being compared with each other to provide individual cylinder indices of the relative combustion efficiency of each cylinder. In still further accord with the present invention, the magnitude of each sub-cyclic back-pressure pulse is measured by integrating the instantaneous values of sensed back-pressure over the crankshaft angle interval defining the associated cylinder's portion of the full cam cycle exhaust back-pressure waveform to provide a full area integral value for each cylinder's associated exhaust pulse, the full area integral value for each cylinder being compared with the average of all cylinders full area integrals to provide the relative indications. In still further accord with the present invention, each cylinder's contribution to the sub-cyclic fluctuation in back-pressure is measured by integrating the instantaneous values of back-pressure associated with each cylinder over a crankshaft sub-angle interval which is less than that associated with the full cylinder portion, the selected crankshaft sub-angle being equal for each cylinder, the actual crankshaft angle sub-angle values being selected in dependence on the particular model type engine. In still further accord with the present invention, the pressure pulse associated with each cylinder is integrated in successive integral slices to determine the most sensitive portion of each pressure pulse, the determination of the most sensitive portion being made by the maximum average value of the integral slices taken at equal angle increments for each cylinder, the maximum average value defining the crankshaft sub-angle interval over which the actual integral value for each cylinder is measured and then compared with each other to determine the relative contributions of each.

The relative exhaust back-pressure test of the present invention provides for determination of overall engine performance by analyzing the relative combustion efficiency of the engine cylinders. The acquisition and integral analysis of the acquired back-pressure information allows for detection of subtle differences between the individual cylinder's performance which is particularly well suited for use with the extra-vehicular testing of engines, as required in hot-test. These and other objects, features and advantages of the present invention will become more apparent in light of the following detailed description of the best mode embodiment thereof, as illustrated in the accompanying drawing.

BRIEF DESCRIPTION OF DRAWING

FIG. 8 (a), (b), (c) is an illustration of a composite waveform of the sensed, instantaneous values of engine back-pressure as acquired over one engine cam cycle according to the present invention;

FIG. 9 is a simplified logic flowchart diagram illustrating the relative back-pressure test of the present invention as performed in the control system of FIG. 2.

BEST MODE FOR CARRYING OUT THE INVENTION

Figure 1:
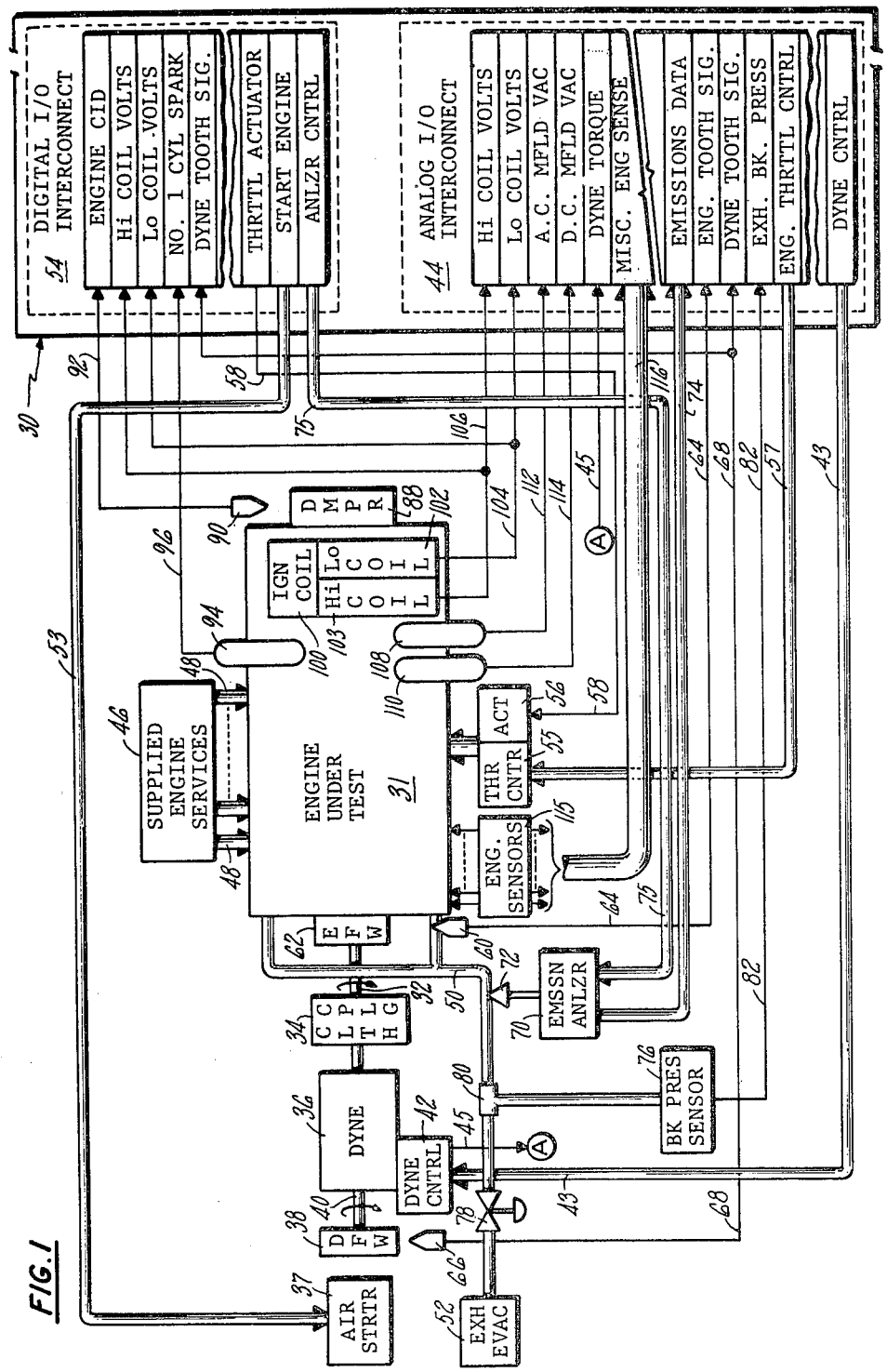
FIG. 1 is a schematic block diagram illustration of the instrumentation in a typical engine hot-test installation in which the present invention may be used.

Referring to FIG. 1, in a simplified illustration of an engine hot-test installation in which the present invention may be used, a test control system 30 receives sensed engine data from the test engine 31 which is mounted in a test stand (not shown) and loaded by connection of the engine crankshaft 32 through a coupling assembly 34 to an engine load, such as a brake mechanism or, as illustrated, a dynamometer (dyne) load 36. The dyne is known type, such as the Go-Power Systems model D357 water dynamometer, equipped with an air starter 37. The air starter is used to crank the test engine (through the dyne) in the absence of an engine mounted starter. A dyne flywheel 38, connected to the dyne shaft 40, includes a ring-gear (not shown) having a selected number of precision machined gear teeth equally spaced around the circumference of the ring-gear so that the tooth-to-tooth intervals define substantially equal increments of dyne shaft angle. Dyne control circuitry 42 controls the dyne load torque (Ft-Lb) to a set point torque reference signal provided on lines 43 from the analog interconnect 44 of the control system 30, by controlling the amount of water in the dyne drum (not illustrated in FIG. 1). The dyne control circuitry also provides a sensed, actual dyne torque signal on a line 45 to the analog interconnect of the control system.

The test engine is provided with the engine services 46 necessary for engine operation, such as fuel, oil, and water, etc. through service connections 48. The engine exhaust manifolds are connected through exhaust line 50 to an exhaust evacuating pump 52. Following engine start-up in response to a "start engine" discrete signal presented on lines 53 to the starter 37 (or engine starter if available) from the control system digital interconnect 54, an engine throttle control 55 and associated throttle control actuator 56 control the engine speed (RPM) to an engine RPM reference set point signal provided to the control on lines 57 from the analog interconnect. In addition, the actuator receives a discrete signal from the digital interconnect 54 on a line 58, which is used to provide snap acceleration of the engine as described hereinafter. In summary, the test engine under hot-test is operated under controlled load at selected engine speed profiles to permit the dynamic analysis of the engine base-line parameters and the engine diagnostic routines described hereinafter.

The hot-test sequence examines engine base-line parameters related to speed, exhaust emissions, ignition cycle timing, and spark duration to determine engine health, i.e., output power and combustion efficiency. The speed measurements include engine crankshaft speed (RPM) and dyne shaft speed. The indication of engine crankshaft speed may be provided by any type of rotational speed sensing device, such as a shaft encoder, or preferably a magnetic pick-up sensor 60, such as Electro Corp. RGT model 3010-AN Magnetic Proximity Sensor, which senses the passage of the teeth of the engine ring-gear mounted on the engine flywheel 62 and provides an engine series tooth pulse signal on the line 64 to the analog interconnect. The actual number of ring-gear teeth depends on the particular engine model with 128 teeth being average. The teeth are uniformly spaced around the circumference of the ring gear, such that 128 teeth provide tooth-to-tooth spacing corresponding to a crankshaft angle interval of 2.813 degrees. The is adequate for marking subcyclic cylinder events within the ignition cycle, but due to the variation of total tooth count with different engine models it may be preferred to provide the crankshaft angle resolution required by the control system from the load speed indication. The load speed may also be sensed with a shaft encoder or by sensing the teeth of the dyne ring-gear which has a tooth count typically twice that of the engine ring-gear, or 256 teeth for the 128-tooth engine ring-gear. This is provided by a proximity sensor 66, similar to the sensor 60, which senses the passage of the dyne ring-gear teeth to provide a dyne series tooth pulse signal on line 68 to the analog interconnect. The precision edging of the dyne teeth allows for exact resolution on the leading and trailing edges of each of the tooth pulse signals which permits (as described in detail hereinafter) edge detection of each to provide an equivalent 512 dyne tooth intervals per crankshaft revolution.

Engine exhaust measurements include both exhaust gas analysis and exhaust back-pressure measurements. The emissions analysis measures the hydrocarbon (HC) and carbon monoxide (CO) constituents of the exhaust with an emissions analyzer 70, of a type known in the art such as the Beckman model 864 infrared analyzer. The analyzer is connected to the exhaust pipe 50 through an emissions probe 72. The HC and CO concentration is determined by the differential measurement of the absorption of infrared energy in the exhaust gas sample. Specifically, within the analyzer two equal energy infrared beams are directed through two optical calls; a flow through exhaust gas sample cell and a sealed reference cell. The analyzer measures the difference between the amounts of infrared energy absorbed in the two cells and provides, through lines 74 to the control system analog interconnect, HC and CO concentrations as DC signals with full scale corresponding typically to: (1) a full-scale HC reading of 1000 PPM, and (2) a full-scale CO of 10%. The analyzer operating modes are controlled by control signal discretes provided on lines 75 from the digital interconnect. The exhaust back-pressure instrumentation includes a back-pressure sensor 76, such as a Viatran model 21815 with a range of ±5 PSIG, and a back-pressure valve 78, such as a Pacific Valve Co. model 8-8552. The pressure sensor is connected to the exhaust line 50 with a tap joint 80 and provides a signal indicative of exhaust back-pressure on line 82 to the analog interconnect. The back-pressure valve simulates the exhaust system load normally provided by the engine muffler and is typically a manually adjustable 2" gate valve with a range of 15 turns between full open and full closed.

The engine ignition timing information is derived from the crankshaft angle information provided by the dyne and engine ring-gear teeth and by sensing a crankshaft index (CI), such as the timing marker on the engine damper 88. The CI is sensed with a magnetic pick-up sensor 90, such as the Electro Corp. Model 4947 proximity switch, which preferably is mounted through a hole provided on the damper housing and measures the passage of the timing marker notch on the damper. The sensor mounting hole is at a known crankshaft angle value from the top dead center (TDC) position of the #1 cylinder, and is determined from the engine specifications. The notch triggers a signal pulse by passing near the CI sensor every crankshaft revolution and the CI pulses are provided on lines 92 to the control system digital interconnect. In addition, the ignition cycle information includes measurement of the #1 cylinder sparkplug firing which in combination with the CI sensor indication provides a crankshaft synchronization point corresponding to the TDC of the #1 cylinder power stroke. The spark firing is sensed by a clamp-on Hall effect sensor 94 which provides a voltage signal pulse coincident with the sparkplug firing on a line 96 to the digital interconnect.

The sparkplug signal duration measurements are provided by measuring the primary (Lo Coil) and secondary (Hi Coil) voltage signals of the engine ignition coil 100. The Lo Coil voltage is sensed by a connection 102 to the primary of the coil and the Hi Coil voltage is measured with a sensor 103, such as a Tektronix Model P6015 high-voltage probe with a range of 0 to 50 KV. The signals are provided on lines 104, 106 to both interconnects of the control system.

In addition to sensing engine speed, exhaust, ignition timing and spark duration parameters, the intake manifold vacuum pressure is also sensed. Two vacuum measurements are made; a DC manifold vacuum which provides the average vacuum level, and an AC manifold vacuum which provides instantaneous values of vacuum. The AC measurements are made by inserting a pressure sensor 108, such as a VIATRAN Model 218 with a range of ±1 PSIG, in the engine vacuum line connected to the PCV valve. The DC manifold vacuum sensor 110 may be a VIATRAN Model 218 with a range of ±15 PSIG inserted in the same vacuum line. Each sensor provides a voltage signal indicative of the sensed pressure on lines 112, 114 to the control system. Additional engine sensors 115, such as pressure and temperature of the engine oil, fuel, water, etc. are provided to the control system through lines 116. The sensors provide the information on the necessary prerequisite engine ambient conditions which must be established prior to test, as discussed in detail hereinafter.

Figure 2:
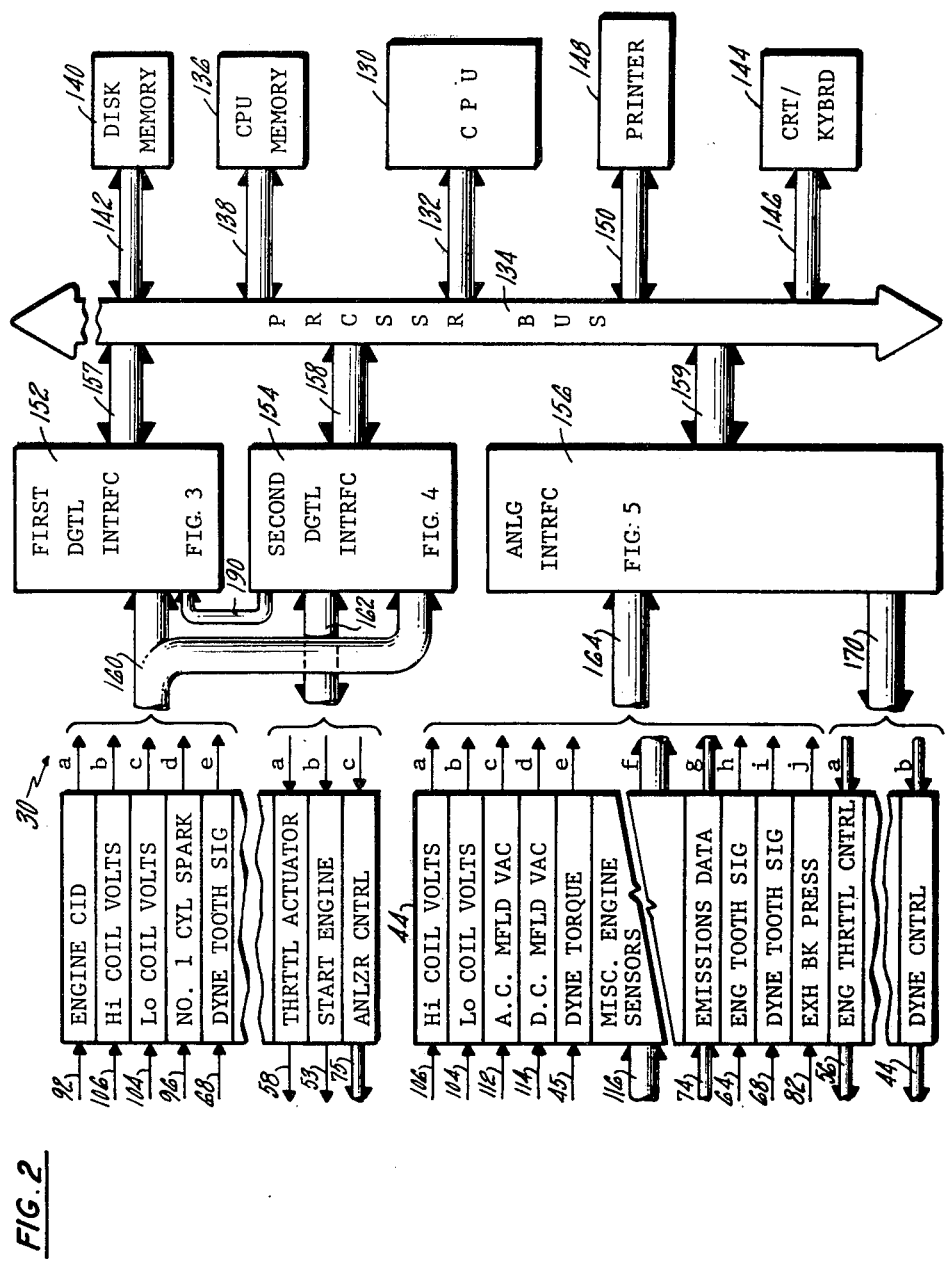
FIG. 2 is a system block diagram of a hot-test control system which may incorporate the present invention.

With the test engine connected to the load dyne 36 and instrumented as shown in FIG. 1, the hot-test control system automatically programs the start-up (cranking), ignition, and running of the engine at prescribed engine speed (RPM) and engine load conditions. Referring now to FIG. 2, a hot-test control system 30 which may incorporate the present invention includes a central processing unit (CPU) 130 which preferably is a known, proprietary model general purpose computer, such as the Digital Equipment Corporation (DEC)

Model PDP-11/34 minicomputer which may be used with a software data system based on the DEC RSX11-M multi-task real time software package. The size of the CPU depends on the data processing tasks of the system, so that depending on the hot-test system requirements, a smaller microcomputer, such as the DEC LSI-11, may be used for the CPU. Similarly, a number of smaller CPUs may be used, each dedicated to a particular aspect or function of the system. The selection of the particular type of CPU to be used is one which may be made by those skilled in the art, based on system through-put requirements. It should be understood, however, that selection of the particular type of CPU is dependent on overall hot-test requirements alone, and forms no part of the present invention. If it is considered necessary, or practical, any one of a number of known processing systems and softward packages may be used as may be obvious or readily apparent to those skilled in the art.

As known, the CPU includes general purpose registers that perform a variety of functions and serve as accumulators, index registers, etc. with two dedicated for use as a stack pointer (the locations, or address of the last entry in the stack or memory) and a program counter which is used for addressing purposes and which always contains the address of the next instruction to be executed by the CPU. The register operations are internal to the CPU and do not require bus cycles. The CPU also includes: an arithmetic logic unit (ALU), a control logic unit, a processor status register, and a read only memory (ROM) that holds the CPU source code, diagnostic routines for verifying CPU operation, and bootstrap loader programs for starting up the system. The CPU is connected through input/output (I/O) lines 132 to a processor data bus 134 which includes both control lines and data/address lines and functions as the interface between the CPU, the associated memory 136 which is connected through I/O lines 138 to the data bus, and the peripheral devices including user equipment.

The memory 136 is typically nonvolatile, and may be either a core memory, or preferably a metallic oxide semiconductor (MOS) memory with battery backup to maintain MOS memory contents during power interruption. The MOS memory may comprise one or more basic MOS memory units, such as the DEC MOS memory unit MS11-JP each having 16 K words of memory location, as determined by system requirements. The memory is partitioned into several areas by the system application software, as described hereinafter, to provide both read only, and read/write capability.

The peripheral devices used with the CPU and memory, other than the user interface devices, may include: (1) a disk memory loader 140, such as a DEC Pac Disk Control unit with two disk drives, connected through I/O lines 142 to the bus, (2) a CRT/keyboard terminal 144, such as DEC ADDS model 980, connected through I/O lines 146 to the bus, and (3) a printer 148, such as the DEC LA 35 printer, connected through I/O lines 150. The printer and disk loader are options, the disk memory loader being used to store bulk engine data or specific test routine instructions on floppy disks, which may then be fetched by the CPU. Alternatively, the specific test routines may be stored in the memory 136 such that the disk memory loader is used to store only bulk data.

The CRT/keyboard unit provides man-machine interface with the control system which allows an operator to input information into, or retrieve information from the system. These man-machine programs may include general command functions used to start, stop, hold, or clear various test routines, or to alter engine speed or dyne torque set point values for the engine throttle and dyne control circuitry. In addition, a specific "log-on" procedure allows the operator to alter the engine specification data stored in a data common portion of the memory 136.

The user interfaces include first and second digital interfaces 152, 154, and analog interface 156, connected through I/O lines 157–159 to the processor bus. Each digital interface receives the sensed engine data from the digital I/O interconnect 54 on lines 160. The digital interface 154 provides the required control system output discrete signals to the test engine instrumentation through lines 162 to the digital I/O interconnect. The sensed engine data presented to the analog I/O interconnect 44 is presented through lines 164 to the analog interface which provides the control system set point reference signals for the engine throttle and dyne control circuitry on lines 170 back to the analog interconnect.

In the operation of the CPU 130 and memory 136 under the application software for the system, the memory is partitioned into a number of different areas, each related to a different functional aspect of the application software. As used here, the term application software refers to the general structure and collection of a coordinated set of software routines whose primary purpose is the management of system resources for control of, and assistance to, the independently executable test programs described individually hereinafter. The three major areas of the memory include: (1) a library area for storing a collection of commonly used subroutines, (2) a data common area which functions as a scratch pad and which is accessible by other programs in memory which require scratchpad storage, and (3) a general data acquisition program area which includes routines for: collecting raw data from the user interfaces and storing the raw data in data common, deriving scaled, floating point data from the raw data, and a safety monitor subroutine which monitors some of the incoming data for abnormal engine conditions such as engine overspeed, low oil pressure, and excessive engine block temperature. In addition to the three main program areas, a further partition may be provided for a test sequencer program which functions as a supervisory control of the engine hot-test sequence of operations.

The data common area is partitioned into subregions for: (1) storing the sensed raw data from the user interfaces, (2) storing scaled data derived from the stored sensed data by use of selected conversion coefficients, (3) storing engine model specifications such as number of cylinders, firing order, CI sensor mounting hole angle, number of ring-gear teeth, etc., and (4) storing a description of the desired test plan (a list of test numbers).

The areas in memory dedicated to the various test plans stored in data common (4) include a test module partition in which the engine tests requested by the test sequencer program are stored during execution of the test. The tests stored represent separately built program test routines executed during hot-test, that have a name format "TSTXXX" where XXX is a three-digit number. The test routines themselves are stored either in a further partition of the memory 136 or, if optioned, stored on floppy disks and read into the test module partition from the disk driver.

Each CPU instruction involves one or more bus cycles in which the CPU fetches an instruction or data from the memory 136 at the location addressed by the program counter. The arithmetic operations performed by the ALU can be performed from: one general register to another which involves operations internal to the CPU and do not require bus cycles (except for instruction fetch), or from one memory location or peripheral device to another, or between memory locations of a peripheral device register and a CPU general register; all of which require some number of bus cycles.

In the control system embodiment of FIG. 2, a combination interrupt/noninterrupt mode of operation is selected, although if desired, total noninterrupt may be used with further dedicated programming. The digital interfaces 152, 154 establish the processor interrupt mode of operation in which the CPU reads particular sensed engine data from the analog interface in response to specific events occurring within each engine cycle. The interrupt mode includes several submodes in which the CPU is directed to read specific input parameters, or combinations of parameters, depending upon the selected test. Each of the interrupts have an associated vectored address which directs the CPU to the particular input channels, or the locations in memory associated with the particular analog channel. These vectored interrupts are used to cause the CPU to read at the particular selected interrupt time: (a) engine cam angle alone, (b) cam angle and one or more analog channels, (c) one or more analog channels without cam angle, and (d) the spark duration counter (described hereinafter with respect to FIG. 4). In the absence of interrupts, i.e., the noninterrupt mode of operation, the CPU reads the data provided at the analog interface continuously as a stand alone device. In this noninterrupt mode, the sample sequence and sample time interval, typically one second, is ordered by the general data acquisition routine which stores the raw data in the memory data common location.

The interface 152 provides the interrupts required to synchronize the CPU data acquisition to specific, selected events within the engine cycle. This is provided by synchronizing the CPU interrupts to crankshaft angle position by: (1) sensing instantaneous crankshaft angle position from the dyne tooth signal information, and (2) detecting the crankshaft synchronization point (the TDC of the #1 cylinder power stroke) by sensing the CI signal from the CI sensor (90, FIG. 1) together with the number one cylinder firing as provided by the spark sensor (94, FIG. 1), as described hereinafter. With the crankshaft index marking the beginning of each engine cycle, the dyne tooth signal provides information on the instantaneous crankshaft angle position from this crankshaft synchronization point, such that the engine ignition cycle may be mapped. As a result, cam cycle and subcyclic information related to specific cylinder events within the ignition cycle may be accurately tagged as corresponding to known crankshaft angle displacement from the synchronization point. The interface 152 then interrrupts the processor at predetermined locations within the engine cycle, each identified by a particular crankshaft angle value stored in the memory 136 and associated with with a particular engine cycle event. In addition, the interface 152 also provides CPU interrupt for: (1) the presence of number one cylinder spark ignition pulse, (2) the rising edge of the Lo coil voltage signal (which indicates the availability of the KV voltage to fire the sparkplug), (3) the CI signal, and (4) a discrete SPARK DURATION DATA READY signal provided from the digital interface 154 (described hereinafter with respect to FIG. 4).

Figure 3:
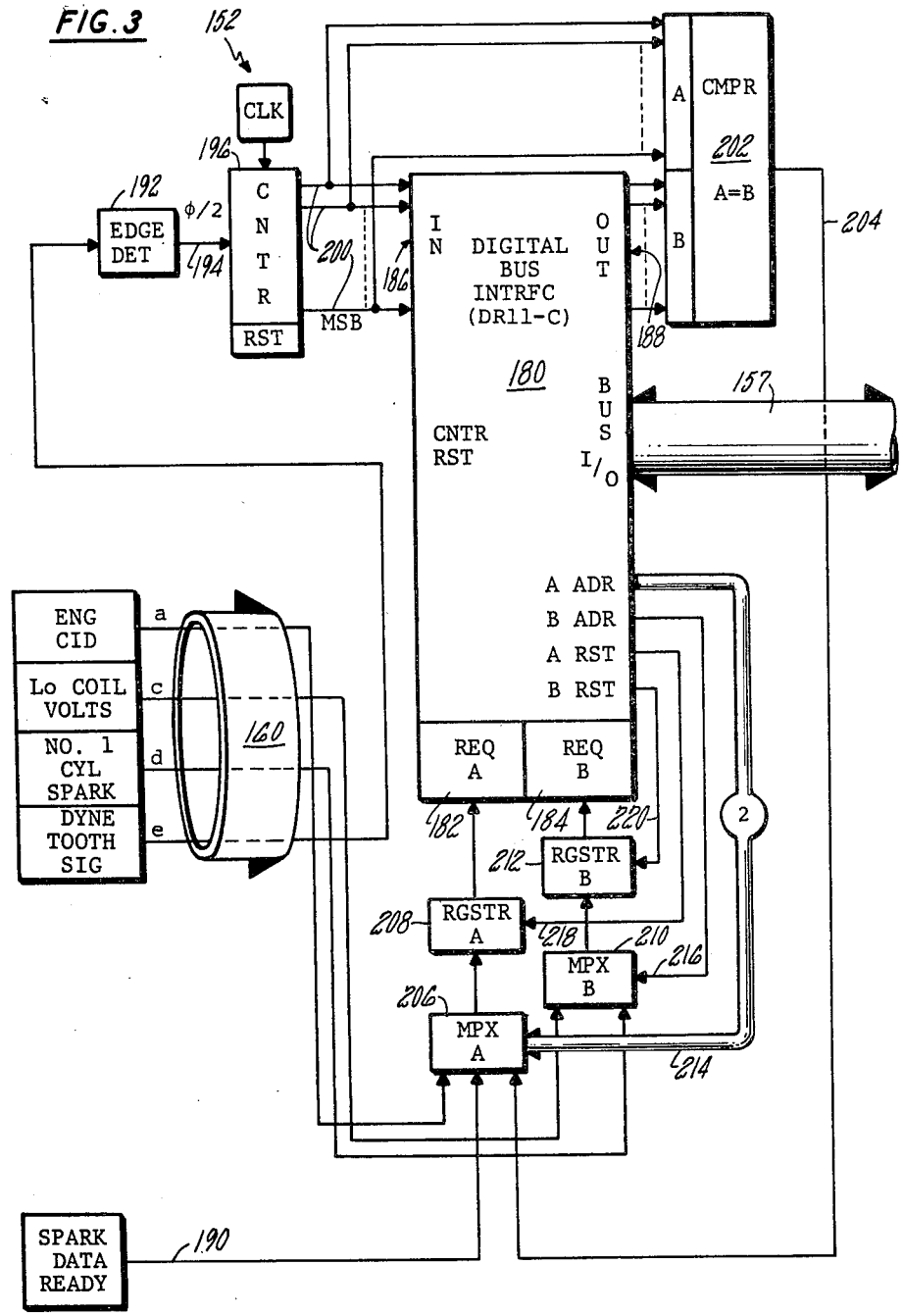
FIG. 3 is a system block diagram illustration of one subsystem as may be used in the control system embodiment of FIG. 2.

Referring now to FIG. 3, the interface 152 includes a general purpose, parallel in/out bus interface 180, such as the DEC DR11-C, which interfaces the processor bus 134 to the signal conditioning circuitry illustrated. As known, the DR11-C includes a control status register, and input and output buffer register, and provides three functions including: (1) address selection logic for detecting interface selection by the CPU, the register to be used, and whether an input or output transfer is to be performed, and (2) control logic which permits the interface to gain bus control (issue a bus requests) and perform program interrupts to specific vector addresses. The interrupts are serviced at two inputs of the bus interface; REQ A input 182, and REQ B input 184. Each input responds to a discrete presented to the input and, in the presence of such a discrete, generates the bus request and interrupt to the CPU over the bus I/O line 157. The interface also includes 16 pin user input and output connections 186, 188 for data transfer between the signal conditioning circuitry and the processor.

The interface 52 receives: the engine CI, the Lo-Coil signal, the number one cylinder spark ignition signal, and the dyne raw tooth signal on lines 160 from the digital interconnect 54, and the SPARK DATA READY signal on a line 190 from the interface 154. The dyne tooth signal is presented to an edge detection circuitry 192 which detects the rising and falling edges of each raw dyne tooth pulse and provides a signal pulse for each, resulting in a doubling of the frequency, i.e., X 2 pulse count for each camshaft cycle (engine cycle). The conditioned dyne tooth signal is presented on an output line 194 as a series pulse signal at a frequency twice that of the raw tooth signal. For a dyne tooth count of 256 teeth the conditioned tooth signal provides 512 pulses per crankshaft revolution; each pulse-to-pulse interval defines a crankshaft angle increment equal to 360°/512, or 0.703°. Since each camshaft cycle is equal to two crankshaft revolutions, or 720°, the camshaft angle measurement revolution provided by the conditioned tooth signal is better than 0.1%.

The conditioned dyne tooth signal on the line 194 is presented to a ten bit counter 196 which counts the conditioned tooth signal pulses and provides a 10 bit binary count on lines 200 to the input 186 of the digital interface 180. The counter 196 provides a continuous count of the tooth pulses, continuously overflowing and starting a new 10-bit count. The count output from the counter 196 is also presented to one input (A) of a comparator 202 which receives at a second input (B) a 10-bit signal from the user output 188. The comparator provides a signal discrete on an output line 204 in response to the condition A=B.

The CI signal, the SPARK DATA READY signal, and the output of the comparator 202 on the line 204, are presented to the input of a multiplexer (MPX) 206, the output of which is presented to a buffer register 208. The Lo-coil voltage signal and the number one cylinder spark signal are each presented to a second MPX 210, the output of which is connected to a second buffer register 212. The outputs of the registers 208, 212 are connected to the interrupt inputs 182, 184 of the bus interface. The signal select function provided by the MPX's 206, 210 is controlled by address signals from the CPU on the bus interface output lines 214, 216. The address signals select the inputs called for by the CPU depending on the particular test routine or engine condition to be monitored at the particular time. The interface 180 also provides rest discretes for the registers 208, 212 on lines 218, 220 following the receipt of the buffered discrete at the interrupt inputs.

In operation, the control system acquires camshaft synchronization by having the CPU provide a SELECT CI address signal on lines 214 to the MPX 206. The next appearing CI signal is steered into the register 208 and read at the input 182. The interface generates a bus request and an interrupt back through the data bus to the CPU, which when ready, responds to the interrupt by reading the counter output on the lines 200. The count value is stored in data common. The CPU processes a number of CI interrupts, each time reading the counter output. The ten bit counter provides alternating high and low counts on successive CI interrupts, corresponding to TDC of the power stroke and intake stroke of each engine cycle. Typically, the count samples at alternate interrupts are averaged to provide two average count signals corresponding to the two interrupts in each cycle. The CPU next requests the number one cylinder spark discrete by outputting a READ NO. 1 SPARK address signal on the line 216 to the MPX 210. In response to each spark signal interrupt, the CPU reads the output of the counter 196. Since the spark discrete signal appears only once in each engine cycle, as opposed to the twice appearing CI signal, the count corresponding to the spark discrete is compared to the two averaged count signals for the CI interrupt. The CI count closest to that of the spark count is selected as the CI corresponding to the number one cylinder power stroke. The CI sensor crankshaft angle displacement from true TDC is read from memory and the equivalent angle count is added to the selected CI count ($CI_p$) to provide the crankshaft synch point count which is stored in memory. The difference count between the spark count and synch point count represents the engine timing angle value, which is also stored in memory. The subroutines for camshaft synchronization are described hereinafter with respect to FIG. 7.

With the engine cam cycle defined by the stored count in memory the CPU may specify particular camshaft angles at which it desires to read some of the engine sensed parameters. This is provided by reading the desired cam angle value from the memory 136 to the output 188 of the interface 180, i.e., the B input of the comparator 202. In response to the count on the lines 200 from the counter 196 being equal to the referenced count, the comparator provides a discrete to the MPX 206, which is addressed to the comparator output by the appropriate "SELECT COMPARATOR" address on the lines 214. This interrupt is serviced in the same way providing a vectored address to the CPU and steering it to the particular one of the analog input channels.

Figure 4:
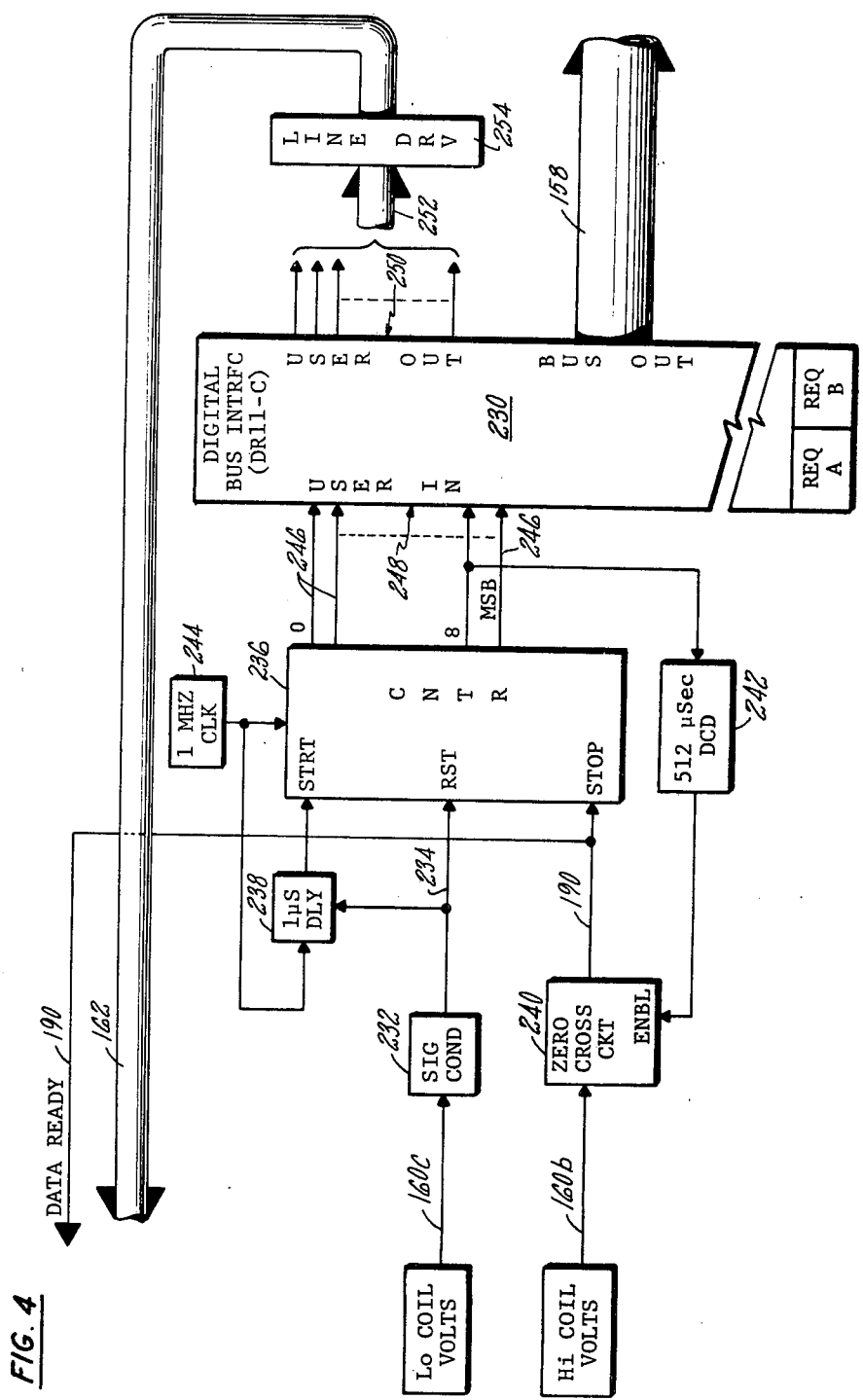
FIG. 4 is a system block diagram illustration of another subsystem as may be used in the control system embodiment of FIG. 2.

Referring now to FIG. 4, the digital interface 154 also includes a digital bus interface 230, such as a DR11-C. The interface 154 receives the sensed engine discrete signals including the Hi-coil and Lo-coil voltage signals on lines 160. The Lo-coil signal is presented to signal conditioning circuitry 232 which squares up the leading edge of the signal and provides the conditioned signal on a line 234 to the reset (RST) input of a twelve bit counter 236 and to the enable (ENBL) input of a one-shot monostable 238. The Hi-coil signal is presented to a zero crossover circuit 240 which when enabled provides the SPARK DATA READY signal on the line 190 in response to the presence of a zero amplitude, i.e., crossover of the Hi-coil signal.

As described hereinafter with respect to the sparkplug load tests, each Hi-coil voltage signal which is representative of successive sparkplug voltage signals includes an initial KV peak voltage followed by a plateau representative of the actual plug firing interval. The peak KV portion is followed by a ringing of the waveform which, in some instances, may be detected by the zero crossover circuit as a true crossover, therefore, the crossover circuit is enabled only after a selected time interval following the leading edge of the Lo-coil signal. The enable is provided by a decode circuit 242 which senses the output of the counter 236 and in response to a count greater than that corresponding to a selected time interval, typically 512 microseconds, provides an enable gate to the zero crossover circuit. The SPARK DATA READY discrete from the zero crossover circuit is provided both to the input of the digital interface 152 and to a stop (STP) input of the counter 236. A one megahertz signal from a clock 244 is presented to the count input of the counter 236 and to the input of the monostable 238, the output of which is presented to the start (STRT) input of the counter.

The counter functions as an interval timer and provides an indication of the time interval between the Lo-coil leading edge and the Hi-coil zero crossover which corresponds to the time duration of the sparkplug voltage signal. In operation, the leading edge of the conditioned Lo-coil signal resets the counter and triggers the monostable which, following a prescribed delay (typically one clock period) starts the counter which then counts the one megahertz clock pulses. In response to a lines 246 count greater than 512, the decode 242 provides the enable to the zero crossover circuit. At the Hi-coil crossover, the crossover circuit provides the SPARK DATA READY discrete on the line 190, which stops the counter and if selected by the CPU, interrupts the CPU via the digital interface 152. The interrupt causes the CPU to read the count at input 248 of the bus interface as an indication of the time duration of the sparkplug firing voltage. Typically, this sparkplug duration count is read continuously by the CPU, which with the synchronization to the camshaft angle identifies each sparkplug signal with its associated cylinder.

The bus interface 230 also provides at a user output 250 the digital discrete signals corresponding to the START ENGINE signal, and the discrete signals associated with the throttle actuator (56, FIG. 1) and with control of the emissions analyzer (70 FIG. 1). These discrete enable signals to the analyzer include flush, sample, drain, and sample intake commands which cause the analyzer to function in a program, all of which is known in the art. All of the discretes are presented through output lines 252 to line drivers 254, the output of which is presented through the lines 162 to the digital interconnect 54.

Figure 5:
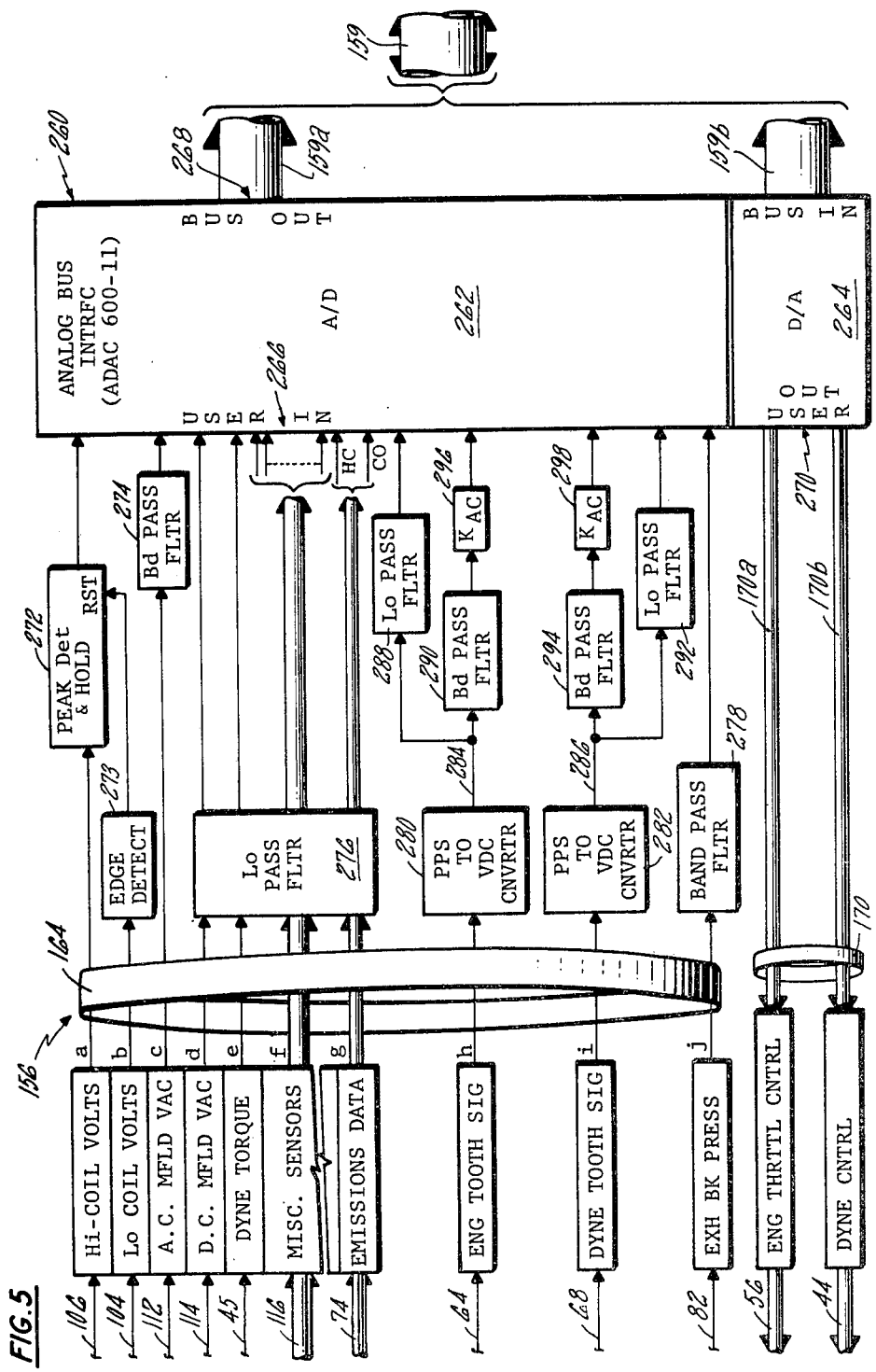
FIG. 5 is a system block diagram illustration of still another subsystem as may be used in the control system embodiment of FIG. 2.

Referring now to FIG. 5, the analog interface 166 includes an analog bus interface 260, such as the DEC model ADAC600-11, having input/output sections 262, 264. The input section includes a series of data acquisition channels connected to a user input 266, and an analog-to-digital (A/D) converter for providing the digital binary equivalent of each sensed analog parameter through the bus output 268 and lines 159a to the processor bus. The output section includes a digital-toanalog (D/A) converter which receives the CPU output signals to the engine on lines 159b and provides the analog signal equivalent of each at a user output 270. The CPU output signals include: the setpoint reference signals for the engine throttle control and the torque setpoint reference signal for the dyne control all included within the lines 170 to the analog interconnect.

The sensed engine signals presented to the analog interface are signal conditioned prior to input to the bus interface. The Hi-coil voltage signal on line 164$_a$ is presented to a peak detector 272 which samples and holds the peak KV value of the signal, and this sampled peak value is presented to the bus interface. The peak detector is resetable by an engine event discrete, such as the trailing edge of low coil from the Lo-coil signal conditioner 273 in the interface 156. The AC manifold signal is presented through a band pass filter 274 to the bus interface. The limits of the band pass filter are selected in dependence on the number of engine cylinders and the range of engine test speeds. The DC manifold vacuum signal, the dyne torque signal, and miscellaneous sensed signals including engine oil, water and fuel temperatures and pressures, and the emissions data (lines 164$_{d-g}$) are coupled to the bus interface through low pass filters 276 which reject any spurious noise interference on the signal lines. The exhaust back-pressure sense signal on a line 164$_j$ is presented to a band pass filter 278 prior to presentation to the bus interface, with the limits selected based on the particular engine and speed range.

The engine raw tooth signal and the dyne raw tooth signal on the lines 164$_{h'i}$ are presented to associated frequency to DC converters 280, 282. The output signals from the converters, which include DC and AC components of the tooth signals, are provided on lines 284, 286 to associated band-pass and low-pass filters. The converted engine tooth signal is presented to low pass filter 288 and band-pass filter 290, and the converter dyne tooth signal is presented to low-pass filter 292 and band-pass filter 294. The DC signals from the low-pass filters 288, 292 provide the DC, or average engine speed ($N_{av}$) for the engine and load, and are presented directly to the bus interface. The AC signal outputs from the band-pass filters, whose limits are selected based on the same considerations given for filters 274, 278, are presented through AC amplifiers 296, 298 to the associated channels of the input interface 262 as the indications of the instantaneous, or AC speed (N) of engine and load.

Figure 6:
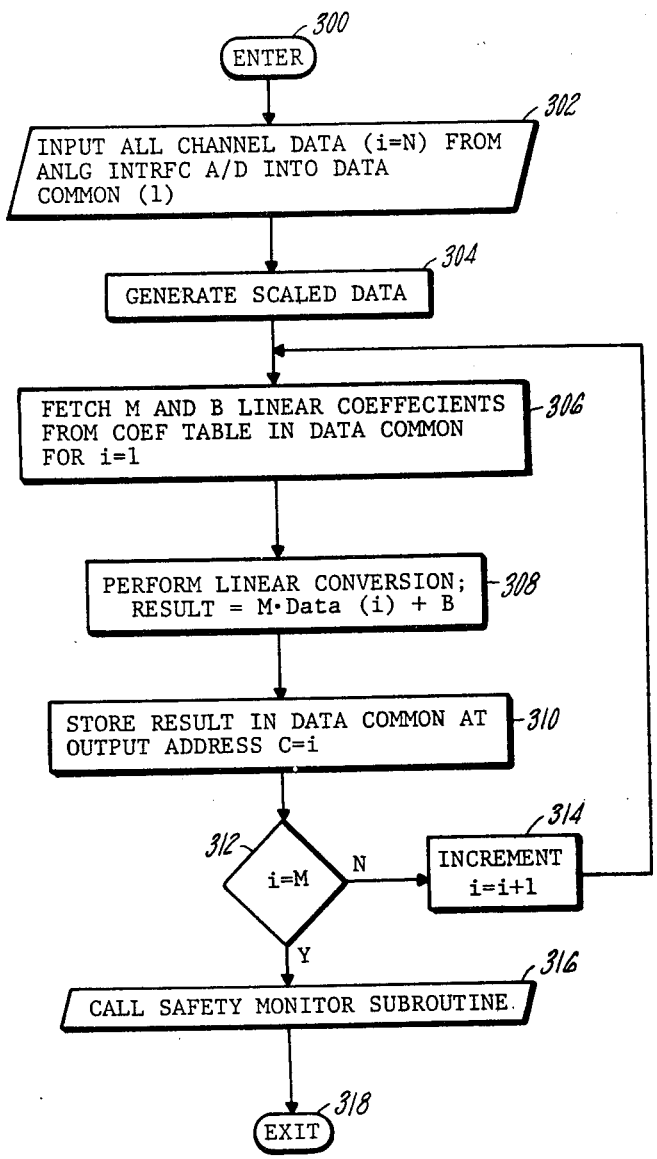
FIG. 6 is a simplified logic flowchart diagram illustrating one functional aspect of the control system of FIG. 2.

As described hereinbefore, the general data acquisition routine collects the data from the analog bus interface 260 at a prescribed sample cycle, typically once per second. The raw data is stored in one section of the data common partition of the memory 136 and a data acquisition subroutine generates a set of scaled data from the raw data using linear conversion coefficients stored in a coefficient table in memory. This second set of data is a properly scaled set of floating point numbers and is used primarily by the dynamic data display programs (for display on the CRT, FIG. 2) and for particular test subroutines which require slow speed data). In addition, the general data acquisition routine may also execute a safety monitor subroutine which checks for overtemperature of the engine block and also low engine pressure limits. Referring now to FIG. 6, in a simplified flow chart illustration of the general data acquisition routine the CPU enters the flow chart following terminal interrupt 300 and executes the subroutine 302 which requires the sampling of all A/D data channels (i=N) from the analog bus interface (260, FIG. 5). The raw data read from the A/D is stored in data common. Following the raw data acquisition subroutine 304 calls for providing a scaled set of data from that sampled in 302. This begins with process 306 which requests the CPU to fetch the linear coefficients (M,B) associated with the particular data channel (i=N) from a coefficient table in data common. Process 308 request the linear conversion of the raw data to the scaled result, after which instructions 310 call for storage of the scaled data in data common at an address C=i. Decision 312 determines if the last conversion was also the last channel (i=N) and if NO then instructions 314 requests an increment of the CPU address counter to the next address and the conversion subroutine is again repeated for each of the raw data values. Following the completion of the linear conversion subroutines (YES to decision 312) the safety monitor subroutine 316 is executed.

Figure 7A:
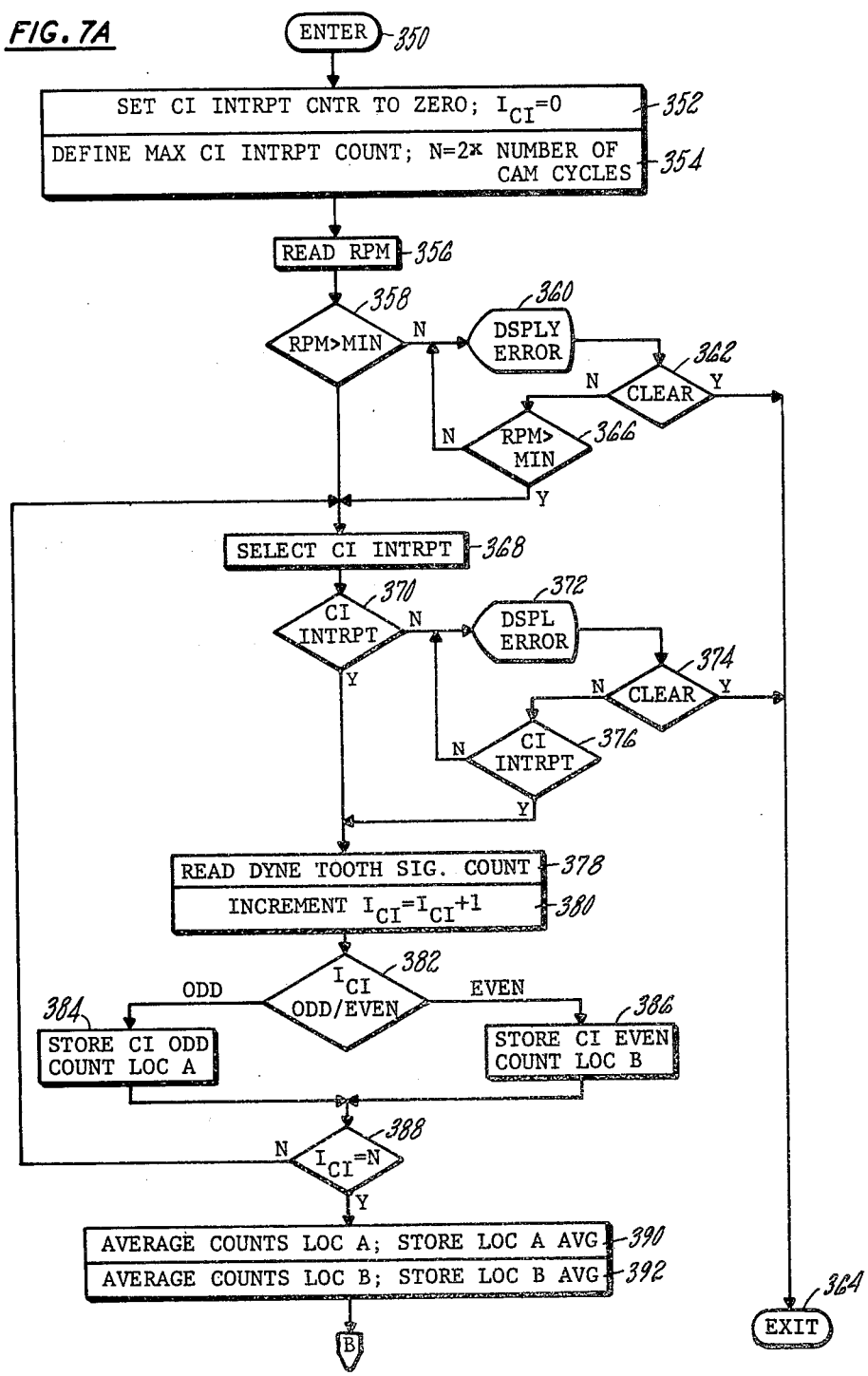
FIG. 7 A along with B is a simplified logic flowchart diagram illustrating one function of the present invention as performed by the control system of FIG. 2.

All of the engine test routines acquire initial value data relating to load speed and torque as well as engine timing and crankshaft synchronization prior to taking the particular test routine engine data. The analog values relating to load speed and torque are obtained under the general acquisition routine. The engine timing and crankshaft synchronization is obtained under a separate subroutine. Referring now to FIG. 7, which is simplified flowchart illustration of a preferred engine timing and synchronization subroutine, the CPU enters the subroutine at 350 (FIG. 7A) and instructions 352 request the CPU to set the crankshaft index (CI) interrupt counter at zero. Instructions 354 request a max. CI interrupt count of N which is equal to twice the number of desired cam cycles of data (M) since the crankshaft index sensor (90, FIG. 1) provides two pulses in each cam cycle. Instructions 356 next request the read of average engine RPM from data common. Decision 358 determines if the actual engine speed is above a minimum speed required to insure valid data. If NO, instructions 360 display an error on the CRT, (144, FIG. 2) followed by decision 362 which determines if an operator entered CLEAR has been made. If there is a CLEAR of the test then the CPU exits the subroutine at 364. In the absence of an operator CLEAR the CPU waits in a loop for the minimum speed condition to be established. This is provided by decision 366 which determines if the latest RPM is greater than minimum, and if NO then continues to display the error and look for a CLEAR in 360, 362. Once the minimum RPM has been exceeded, instructions 368 request the CPU to select CI INTRPT which results in the address select to the MPX 206 of the digital interface 152 (FIG. 3) which monitors the CI pulse signal provided on a line 160$_a$.

Decision 370 monitors the CI interrupt and in the absence of an interrupt diplays an error in instructions 372, and looks for an operator CLEAR in instructions 374. If a CLEAR is entered the CPU exits at 364, and if no CLEAR then decision 376 monitors the presence of a CI interrupt. Following a CI interrupt instruction 378 requests a read of the dyne tooth signal count provided by the counter 196 (FIG. 3). The CPU increments the interrupt counter in intructions 380 to mark the dyne tooth count and decision 382 determines if a present interrupt is odd or even. If odd the count is stored at location A and if even it is stored at location B (instructions 384, 386). Decision 388 next determines if the interrupt is at the max count N and if not then branches back to instructions 368 to set up the next CI interrupt data acquisition. If the maximum number of interrupts have been serviced instructions 390 and 392 request the averaging of all the stored count data in each of the locations A, B to provide an average A count and an average B count.

Figure 7B:
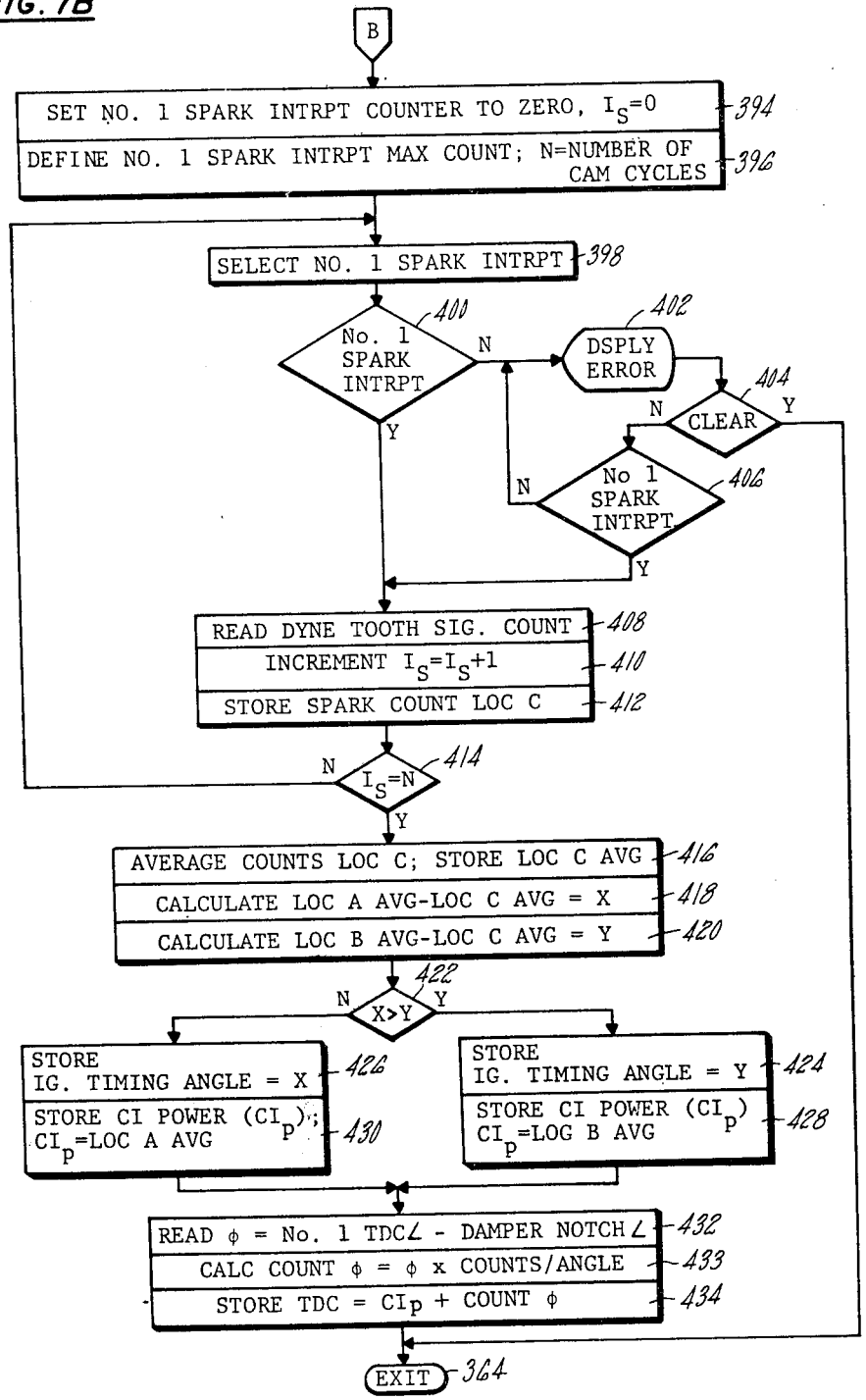

The CPU must identify which of the two interrupts occurring within the cam cycle is associated with the TDC of the #1 cylinder power stroke. This is provided by acquiring the cam angle data associated with #1 cylinder spark ignition. In FIG. 7B, instructions 394 set the #1 spark interrupt to zero and instructions 396 define the max spark interrupt count as M equal to the number of cam cycles of data to be acquired. The CPU then executes the subroutine to determine the cam angle position corresponding to the #1 spark ignition. This begins with instructions 398 to select a NO 1 SPARK INTRPT. The decision 400 looks for the presence of a spark interrupt and if no interrupt appears within a predetermined time interval the CPU again goes into a waiting loop which begins with the display of an error in 402 and the monitoring of an operator entered CLEAR in decision 404. If an operator clears entered the CPU exits the subroutine at 364. If no CLEAR, then the presence of a spark interrupt is continuously monitored in instructions 406.

Following a spark interrupt, instructions 408 read the dyne tooth signal count. Instructions 410 increment the spark interrupt counter by one and instructions 412 call for the storage of the spark count value at location C. Decision 414 determines if this is the last spark interrupt to be serviced, and if not the CPU branches back to instructions 398 to set up for the next interrupt data read. Following the requested number of interrupts, instructions 416 request the averaging of all the count stored at location C to provide a C average count value.

With this information available, the CI interrupt associated with TDC of the power stroke can be determined by comparing the two CI counts (odd/even) to the spark interrupt count. This is provided in instructions 418 et seq which first calls for calculating the difference (X) between the average A and the average C counts. Instructions 420 request the determination of the count difference (Y) between the B average and the C average counts. Decision 422 compares the X and Y counts to determine which is the largest. If the X count is larger, than instructions 424 store the Y difference count as that representative of the engine timing angle value. Similarly, instructions 426 call for storing the X count as the engine timing angle if it is the smaller of the two count differences. Instructions 428, 430 request the CPU store of the crankshaft index power ($CI_p$) as being equal to the count of the B average, or the A average, respectively. In other words, the particular one of the two counts received in the CI interrupt closest to the count corresponding to the spark interrupt is then considered to be the $CI_p$ of #1 cylinder. Instructions 432 request the CPU to read the angle ($\phi$) defined by the engine manufacturer for the particular engine which represents the angular displacement between the mounting hole for the CI sensor in the damper housing and the instantaneous position of the damper notch at true TDC of #1 cylinder. Instructions 433 next request the equivalent count value associated with the displacement angle, and instructions 434 request the calculation of the cam cycle synchronization point, or true TDC of #1 cylinder power stroke, as the sum of the crankshaft index of the power stroke plus the count increment associated with the displacement angle. Following instructions 434, the CPU exits the program at 364.

With the CPU synchronization to the engine crankshaft, the sensed engine data at the analog interface 158 (FIG. 2) may be sensed at any selected crankshaft angle increment, down to the 0.7 degree resolution provided by the conditioned dyne tooth signal to the interface 152. The particular selection of angle increment depends on the resolution accuracy required of the measured data, or the frequency of data change with crankshaft angle. Typically, the selected angle increments may be three or four times greater than the achievable angle resolution, the limitation due primarily to the processor overhead time, i.e., the inability of the processor to gain access to and process the data within the equivalent real time interval associated with the 0.7 degree crank angle interval. In general, each test routine includes its own, dedicated data acquisition subroutine for the particular parameter of interest. The various tests read out the slower engine speed data from data common, as provided by the general data acquisition routine. This slower data includes, among others, the sensed miscellaneous sensors (115, FIG. 1) data relating to oil and water temperatures, the choke position, and the average speed and load torque values, as may be necessary to determine if the engine prequisite conditions have been established prior to test.

The description thus far has been of a hot-test installation and control system which is capable of providing a number of different automated tests for determining the performance of the test engine. The instrumentation described with respect to FIG. 1, and the control system of FIGS. 2–5 together with the description of the application software including the general data acquisition, are illustrative of that required for a hot-test system capable of providing such a number of different performance tests. The present invention may be incorporated in such a system; its use and implementation in such a system, as described in detail hereinafter, represents the best mode for carrying out the invention. It should be understood, however, that the invention may be implemented in a simpler system which includes the engine load, but which includes only that sensing, signal conditioning, and signal processing apparatus required for direct support of the invention.

In the present invention quantitative measurement of IC engine performance is provided by comparison of each cylinder's contribution to the sub-cyclic fluctuations in engine exhaust back-pressure with each other cylinder's contribution to provide an indication of relative performance, or balance between cylinders. The present invention may be used alone or together with other test procedures in a hot-test system as described with respect to FIGS. 1 through 5, which employs subject matter disclosed and claimed in one or more of the hereinbefore referenced, copending applications.

Referring now to FIG. 8, illustration (a) represents one engine cam cycle for a four-cycle, eight-cylinder engine. The cam cycle is equal to two crankshaft revolutions, or 720°. The vectors 600 represent the TDC position of the engine cylinder power strokes as they appear at 90° crankshaft angle intervals within the cam cycle, and are numbered 1 through 8 corresponding to their position in the firing order from the synchronization point 602 obtained from the CPU to crankshaft synchronization subroutine of FIG. 7. The numbers have no relationship to the cylinder locations or identification in the engine block itself. With the synchronization point identified the control system maps the full cam cycle with the nominally anticipated power stroke TDC positions of each cylinder.

With the map of anticipated cam cycle TDC positions, the CPU acquires the instantaneous values of back-pressure at successive equal crankshaft angle increments within the cam cycle, using the interrupt mode in which the digital interface (152, FIG. 3) interrupts at each angle interval selected by the CPU by comparing the selected angle value with the actual angle value provided by the instantaneous count values of the conditioned dyne tooth signal. Referring to FIG. 1, as described herebefore the sensed back-pressure is obtained from the back-pressure sensor 76 and presented on lines 82 to the analog interconnect 44 of the control system. The sensor receives the exhaust sample from the T connection 80 inserted in the engine exhaust line 50 at a distance equal to some number of exhaust pipe diameter values from any exhaust line discontinuity to ensure laminar flow of the exhaust at the connection. Since the back-pressure valve 78 itself provides a restriction the valve is similarly located at some minimum distance from the connection to present the valve from interfering with the laminar flow at the connection. The back-pressure valve 78 provides the exhaust line load normally provided by the engine muffler when installed in a vehicle, and is used primarily for adjusting an ambient back-pressure level which satisfies engine specifications and also to tune the exhaust line to prevent resonance, i.e. organ pipe effect, which may distort the sensed back-pressure signal. The valve itself, however, is not required for use with the present invention since the exhaust line itself provides sufficient loading from which a resolute exhaust back-pressure waveform may be obtained.

The connection of the sensor 76 to the connection 80 is again of sufficient length to prevent turbulence of the exhaust gas sample at the sensor. In general the exact interface of the back-pressure sensor with the engine exhaust system is dependent both on the particular type of test stand installation and also on the particular engine model type. Similarly, the illustrated hot-test system does not include any filtering of the exhaust back-pressure sensed signal. This is the result of the inherent filtering provided by the exhaust system itself for the particular engine model exhaust system. This once again is dependent on the geometry of the particular engine exhaust system, such that signal filters may be required in some systems for filtering out any inherent high-frequency turbulence, all of which is known to those skilled in the art.

Since the relationship between a cylinder's TDC position in its power stroke to the opening of its exhaust valve is known for any particular type engine the particular sub-cyclic fluctuation in back-pressure associated with the cylinder may be identified by its location (angular position) in the cam cycle sensed data set. However, due to the inherent delay in the propagation of the exhaust gas pressure pulses through the exhaust line from the engine to the back-pressure sensor, there is a finite time delay between the occurrence of a cylinder's exhaust valve opening and the sensing of the sub-cyclic pressure pulse associated therewith. In a particular engine model type, identification of the particular exhaust pressure pulse with its associated cylinder may be determined empirically, such as defeating ignition in a selected cylinder and looking at the sensed back-pressure data to identify the defeated cylinder with a particular loss of pressure pulse. With knowledge of the engine firing order the identity of all the pulses from the synchronization point 602 may then be made and associated with a given cylinder.

Referring again to FIG. 8, the solid waveform 604 of illustration (b) represents a composite of the instantaneous sensed sub-cyclic back-pressure data points as acquired in the cam cycle of illustration (a). The composite waveform is illustrated as providing nominal synchronization between the sensed data and the synchronization point 602, such that the cam cycle data set begins with a minimum value, or valley 606 of the waveform. For the waveform 604 it is assumed that any necessary corrections to accommodate for the exhaust gas propagation delay has been accomplished in the control system 30, such that exact synchronization is provided. In reality, however, the day-to-day variation in ambient conditions result in a further phase shift of the sensed data from the synchronization point. Since the pressure pulses travel through the exhaust system at the speed of sound, propagation time is dependent on both ambient temperature and density within the system, both of which vary periodically. This variation is of a far less magnitude than the inherent phase shift, which is installation and engine model dependent, and may be predicted and assigned a plus or minus tolerance value from the synchronization point. In illustration (b) the waveforms 606, 608 represent the anticipated phase shift of the data waveform around the sync point 602, as may occur on a day-to-day basis. The position of the first valley appearing in each of the waveform 606, 608 is illustrated as occurring at $\pm Q$ degrees about the synchronization point. As described hereinafter, this offset may be accommodated for by a unilateral shift in the synchronization point by Q degrees such that each back-pressure data set begins from a synchronization point cam cycle position of zero minus Q degrees. This shift in synchronization point allows the search for the first valley of the back-pressure data to be conducted in a unilateral direction.

Referring now to FIG. 9, in a simplified macro flowchart illustration of the relative back-pressure test of the present invention, as used in the control system of FIG. 2, the CPU enters the flowchart at 610 and executes subroutine 612 to determine if the prerequisite engine test conditions have been established. The prerequisite conditions go to verifying the load torque setting and to ensuring that the engine has achieved thermostat control and selected average engine test speed. The engine test speed and load torque value (Ft-Lb) are selected to maximize the work required of each cylinder, thereby creating higher peak-to-peak fluctuations in the sub-cyclic speed and enhancing the sub-cyclic back-pressure fluctuation amplitudes. In general this maximizing of cylinder work occurs at lower engine speeds in combination with higher load torque values. Of course, the values selected are engine dependent. Typical values for the assumed eight-cylinder engine are an engine speed of 1200 RPM and load torque of 75 Ft-Lb. Prior to beginning the test the selected test speed and load torque values are read out of the test plan in memory and provided through the analog interconnect to the throttle and dyne controls (55, 42, FIG. 1) to establish the setpoint control limits for each. Thermostat control is established by sensing the water and oil temperatures from the miscellaneous sensors (115, FIG. 1). Failure to achieve any one of the prerequisite conditions results in instructions 614 displaying an error on the CRT (144, FIG. 2) and decision 616 determines whether or not an operator-entered CLEAR has been made. If YES the CPU exits at 618. If NO then the CPU branches back to instruction 612 to again check if the fault, or missing condition has been corrected.

Following establishment of prerequisite test conditions, instructions 620 request establishment of the data test file which begins with subroutine 622 in which the CPU senses one or more (M) cam cycles of instantaneous back-pressure (BP) samples at selected equal $\Delta\theta e$ crankshaft angle intervals. This is provided in the interrupt mode established by the interface 152 (FIG. 3) which compares in the comparator 202 the instantaneous dyne tooth count from the counter 196 with the selected count provided by the CPU at the user output 188 of the bus interface 180. The selected counts correspond to the desired crankshaft angle intervals; the particular count value for each angle interval being established under the CPU synchronization with the crankshaft under the routine of FIG. 7. If more than one cam cycle of data is acquired the cam cycle data sets are averaged to provide a mean back-pressure cam cycle data set which is stored in memory.

Each data set value is identified by the crankshaft angle at which it was sensed. Assuming the existence of a phase shift in the sensed data from the synchronization point, as illustrated by waveform 624 of illustration (c) which represents the first two pressure pulses 626, 630 of the waveform 606; the synchronization point 602 intersects the sensed data waveform along the rising edge of the first pulse 626. Since the sensed data is acquired over one full cam cycle (720°) the offset of the composite data set from the sync point may easily be accommodated by wrapping around the data set, such that integration of the waveform may begin at any point with full waveform integration provided. It is preferred, however, to begin the data analysis at some identifiable waveform event, such as the first valley. The reason for this becomes apparent from the description of the waveform analysis, as described hereinafter, where the minimum values (valleys) are used either as the beginning integral limit if full area integration is provided or are used as the beginning point in selecting the most sensitive portion of the individual pulse waveforms for comparisons. For the waveform 624 the first valley 632 occurs between Q and zero degrees, such that offsetting the sync point by $-Q$ degrees (602a) results in the first data point just prior to the valley 632. In the flowchart of FIG. 9 instructions 638 provide this phase shift of the sync point.

Following synchronization the CPU performs one or more integrations of the individual pressure pulses to determine the relative sub-cyclic contributions of each cylinder. This is provided with instructions 640 which may include one or more subroutines, depending upon the particular type integration performed. This may include integration of each individual pressure pulse over its entire pulse width, by first identifying the valleys which precede and follow each pulse in the cam cycle data set and using the valley locations as the integration limits. The valleys are identified by differentiating successive sensed data points, which are stored together with the particular angle value at which they were sensed, with respect to cam cycle angle to determine the minimum data points and their angle, each minimum then being tagged as a valley. Since the nominal number of valleys is known the absence of or excessive number of detected valleys itself indicates a potential engine fault condition. Alternatively each pressure pulse may be integrated over one or more selected portions of its entire pulse width. These smaller portions are selected by determining the most sensitive part of the pulse waveform in terms of the greatest change, or highest integral value obtained, by taking N number of integral slices (641, FIG. 3 (c)) in each of M number of integration intervals (641A-641M) over a portion, or over all of the pulse. As shown in FIG. 8 (c) each succeeding interval begins at one slice further along the pulse width, such that succeeding intervals overlap by N-1 slices. The width of each slice is equal to the angle interval over which the back-pressure data was sensed. The integral slice values in each interval are summed to provide an interval integral value. The intervals are performed over the same angle limits of each pulse and like intervals from each pulse are averaged and compared with preceding average interval values to provide maximum and/or minimum indications. The maximum values are then used as the angular index for defining the respective maximum and minimum sensitivity areas of each pulse. A subroutine 642 included in instructions 640 provides this indexing of the data, as illustrated in the detailed flowchart of FIG. 10.

Figure 10:
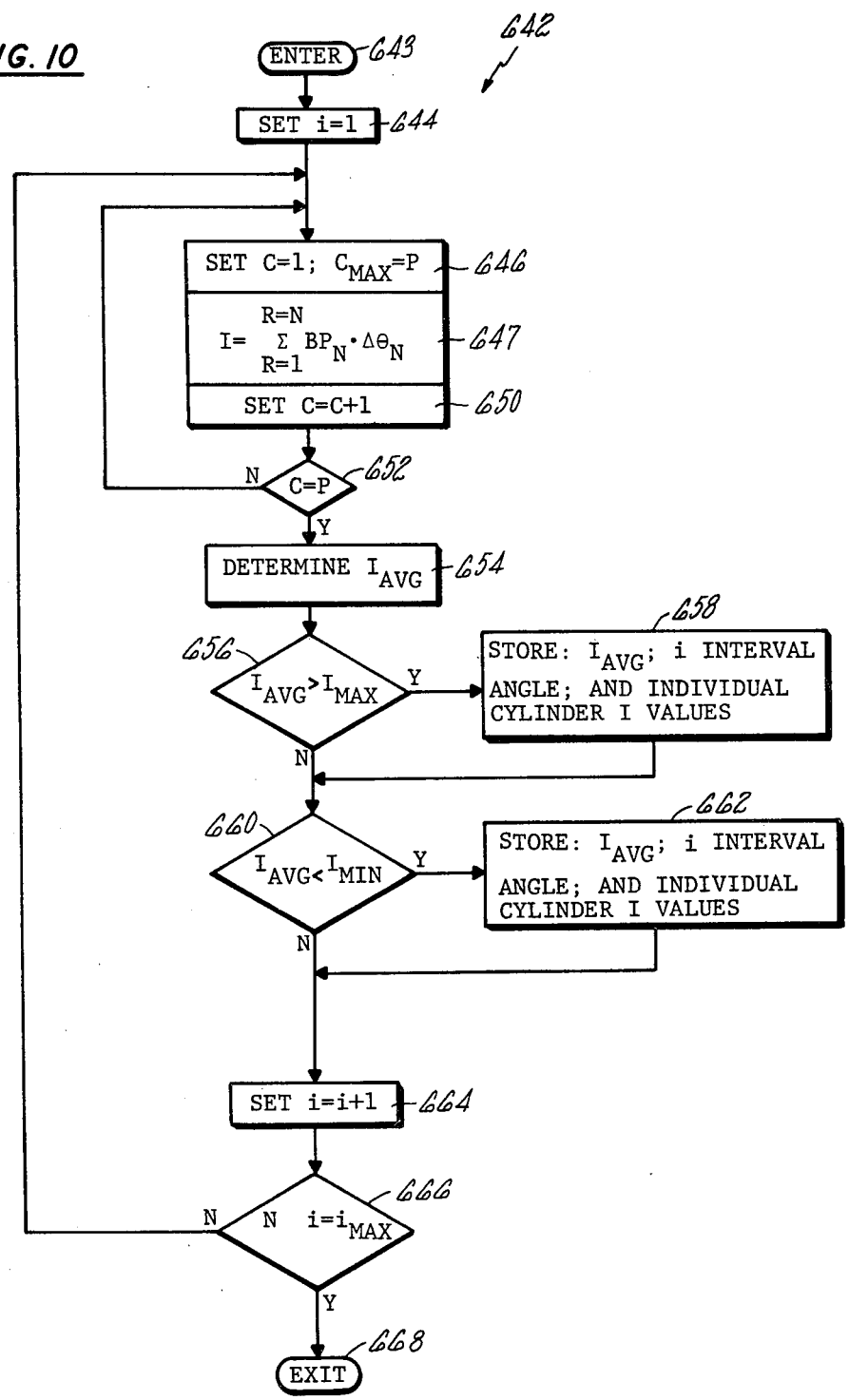
FIG. 10 is a simplified logic flowchart diagram illustrating a subroutine of the flowchart of FIG. 9 in accordance with the present invention.

Referring to FIGS. 8 and 10 the CPU starts the subroutine 642 at 643 and instructions 644 set the angle interval address counter i=1. The angle interval value, i.e. the number M of intervals to be taken for each pulse is selectable. The counter keeps track of the number of intervals in each pulse. The number of slices (N) in each interval is also selectable; the smaller the number of slices, the higher the interval sensitivity. Due to the presence of signal noise, however, a number of slices is preferred. With the counter set at i=1 the CPU provides integration of the data appearing within a first interval associated with each cylinder. The beginning of each cylinder first interval is 90° from adjacent cylinder first intervals. The CPU obtains the integral value over each fixed angle interval by the change in value between successive sensed data points. As illustrated in FIG. 8 the first integral increment for the pulse 626 of the waveform 624 occurs at 645 and begins at the shifted sync point 602a, and that for the pulse 630 at 646 beginning at a 90° from the shifted sync point, with successive pulses integral increments beginning at successive 90° locations along the cam cycle. After the first integral is obtained for each of the cylinders, a second integral is taken beginning at the next cam cycle angle increment integral slice width and so on. This process continues with successive integrals taken for each pulse beginning at successive slice increments from the preceding interval in the same pulse. The process may proceed over the entire pulse or may be terminated at any desired point, such as the determination of the first minimum and/or first maximum averaged integral values. The integral values obtained for each cylinder in a corresponding interval are averaged. Each averaged value is compared with the preceding averaged value to determine the minimum and maximum average integral values. These are stored with their associated angle value as an indication of the most or least sensitive areas of the fluctuations.

The subroutine 642 obtains the interval integral values for each cylinder beginning with instructions 646 which set the cylinder address counter C=1 indicating that this is the first integral for the first cylinder. Instructions 647 request the value for the first integral of the first cylinder, which is then stored in memory. Instructions 650 increment the C counter by 1 and decision 652 determines if this is the last cylinder and if NO then branches back to instructions 646 to take the same i number interval for the next cylinder pulse. After the first integral is taken for the last cylinder, instructions 654 request the average value of all of the interval integral values, and decision 656 determines if the average value is greater than the preceding average value. Since this is the first average value obtained the answer is YES and instructions 658 request storage of the present average value together with the angle values defining the interval, i.e. since each interval start angle is known with respect to the sync point, and since the number N of slices in each interval is similarly known (each slice $\Delta\theta$ being equal to the angle increment at which the data was sensed) the start and stop angle values for each interval is also known, are stored in memory together with the actual interval integral values for each cylinder. Decision 660 determines if the average value obtained in 654 is less than a minimum average. Once again since this is the first average value obtained the answer is YES after which instruction 662 requests storage of the average value, the i interval angle values, and the individual cylinder interval integral values in a min location in memory. Instructions 664 next increment the i counter by 1 and decision 666 determines if this is the last integral slice (i=MAX). If YES the CPU exits the subroutine at 668 and if NO then branches back to instructions 646 to set up for the measurement of the second integral for each of the cylinders.

The subroutine 642 continues taking the successive interval integrals for each cylinder, averaging the values which are then compared with the immediately preceding average values to determine the minimum or maximum values. In this manner the individual pressure pulses are indexed. As stated before, the interval integrals may be taken over the entire width of each pressure pulse for each cylinder, and the values summed to obtain an indication of the area of each pressure pulse which may then be compared with each other to determine the relative performance of each cylinder. This indication is not the full area beneath the pressure pulse, but since it is performed equally for each pulse it is a valid relative indicator. A pure, full area integration value is generally impractical with the graphical integration techniques due to the generally existent fluctuations in the composite data waveform. Alternatively, the subroutine provides for the identification of the maximum and minimum integral values obtained over the entire pulse in terms of crankshaft angle values, and once identified the actual values obtained for each cylinder pulse at the identified crankshaft angles may be compared to provide the relative indication. This provision for selective limit integration of each pulse over a portion of the pulse less than the entire pulse width may be desirable in obtaining more specific indications of the performance of particular engine subsystems, as opposed to a general relative indicator provided by the full area integration. In either event, the subroutine 642 provides the information to allow selection of the desired indicia for cylinder performance comparisons since the individual integral values obtained for each cylinder are accumulated in one location while the maximum and minimum integral values are separately stored. Any of these various types of comparisons may be valid for any given engine, with the only essential criteria being that the comparison is made with the integral values obtained over equal integration limits of each back-pressure pulse.

Following the accumulation of the selected integral indices in the subroutine 642, instructions 670 (FIG. 9) determine the relative back-pressure indication for each cylinder as the ratio of each cylinder integral value (full area or slice) to the average of all of the cylinder integrals. Instructions 672 next request the storage and/or display of the relative back-pressure indications. This may be provided in any suitable form, such as that indicated by Table I for any engine having P number of cylinders.

TABLE I

| CYL # | 1 | 2 | ... | P |
|---|---|---|---|---|
| INT VAL | $K_1$ | $K_2$ | ... | $K_p$ |
| RBP | $\frac{K_1}{K_a}$ | $\frac{K_2}{K_a}$ | ... | $\frac{K_p}{K_a}$ |

Each integral summation of the particular cylinder's contribution to the fluctuation in sub-cyclic back-pressure is listed as integral summations $K_1$ throuth $K_p$, and the relative back-pressure contribution of each cylinder is listed as the ratio of each cylinder's integral value divided by the average of the P number of integrals ($K_a$). Typically the indications obtained for each cylinder are read as a percentage value for comparison with a tolerance established for acceptable engine performance, and the pass/fail status of the engine may then be indicated by discrete indications from the control system.

The relative back-pressure test of the present invention provides a quantitative measurement standard by which engine performance may be measured under conditions involving extra-vehicular testing of engines as under hot-test conditions. It should be understood, however, that the present invention although incorporated within the overall system of FIGS. 1 through 5 may be utilized separately as an individual test requiring only the essential interface with the engine to obtain crankshaft synchronization and sensed back-pressure. The present invention may be used to determine the relative performance of any type of IC engine regardless of the number of cylinders, or engine size. Similarly, although the invention has been shown and described with respect to a best mode emdodiment thereof, it should be understood by those skilled in the art that the foregoing and various other changes, omissions and additions in the form and detail thereof may be made therein without departing from the spirit and scope of this invention.

We claim:

1. Apparatus for measuring the relative exhaust back-pressure contribution between cylinders of an internal combustion (IC) engine connected through its crankshaft to the drive shaft of an engine load and running at a selected speed, comprising:

position sensing means, adapted to be disposed along the drive shaft for providing crankshaft position signals indicative of the instantaneous angular position of the engine crankshaft at successive angle intervals within the engine cycle, each angle interval being less than that associated with a cylinder sub-cycle;

exhaust back-pressure sensing means, adapted to be disposed on the engine for providing signals indicative of the actual engine exhaust back-pressure; and signal processing means, responsive to said crankshaft position signals and said actual engine exhaust back-pressure signals and having memory means for storing signals including signals definitive of the engine cycle, for sampling and storing in said memory means, successive values of said actual exhaust back-pressure signals in response to the presence of each of said crankshaft position signals to provide an indication of the sub-cyclic fluctuations in exhaust back-pressure over at least one engine cycle, and for comparing the magnitudes of each of said sub-cyclic fluctuations occurring in a common engine cycle with each other to provide signal indications of the relative exhaust back-pressure between cylinders.

2. The apparatus of claim 1, further comprising:

crankshaft index sensor means, adapted for disposal on the engine, for providing in each engine cycle a crankshaft synchronization signal definitive of the occurrence of a selected engine cycle event; and wherein said signal processing means is further responsive to said synchronization signal, for providing signals indicative of the crankshaft angle intervals associated with each cylinder exhaust stroke in each engine cycle, and for identifying each of said sub-cyclic fluctuations in exhaust back-pressure as being associated with a particular one of said cylinder exhaust stroke angle intervals to provide identification of each of said sub-cyclic fluctuations in back-pressure with an associated one of the cylinders, whereby said signal indications of relative exhaust back-pressure contribution is provided for each identified cylinder.

3. The apparatus of claim 1, wherein said processing means provides each of said signal indications of relative exhaust back-pressure as the ratio of the magnitude of each of said sub-cyclic fluctuations in back-pressure to the average magnitude of all of said fluctuations in a common engine cycle.

4. The apparatus of claim 1, wherein said crankshaft position signals define equal value crankshaft angle intervals therebetween.

5. The method of measuring the relative exhaust back-pressure contribution between cylinders of an internal combustion engine connected through its crankshaft to the drive shaft of an engine load and running at a selected speed, comprising the steps of:

sensing the instantaneous angular position of the drive shaft to provide crankshaft position signals manifesting the instantaneous position of the engine crankshaft at successive angle intervals within the engine cycle, each angle interval being less than that associated with a cylinder sub-cyclic;

measuring the actual value of the engine exhaust back-pressure in the presence of each crankshaft position signal to provide an indication of the sub-cyclic fluctuations in back-pressure magnitude as they occur over at least one engine cycle; and comparing the magnitudes of each of said sub-cyclic fluctuations occurring in a common engine cycle with each other to provide indications of the relative exhaust back-pressure contribution between cylinders.

6. The method of claim 5, further comprising the steps of:

sensing a crankshaft index to provide a synchronization signal definitive of the occurrence in each engine cycle of a known engine cycle event, determining from said synchronization signal and said crankshaft position signals the crankshaft angle intervals associated with each cylinder exhaust stroke, and identifying each of said sub-cyclic fluctuations in exhaust back-pressure as being associated with a particular exhaust stroke to provide identification of each of said fluctuations with an associated one of the cylinders, whereby said indications of relative exhaust back-pressure are provided for each identified cylinder.

7. The method of claim 5, wherein the step of identifying includes providing said indications of relative exhaust back-pressure contribution as the ratio of the magnitude of each of said sub-cyclic fluctuations in manifold vacuum to the average magnitude of all of said fluctuations in a common engine cycle.

* * * * *

UNITED STATES PATENT AND TRADEMARK OFFICE
CERTIFICATE OF CORRECTION

PATENT NO. : 4,302,814
DATED : November 24, 1981
INVENTOR(S) : Gary G. Full and Rinaldo R. Tedeschi It is certified that error appears in the above—identified patent and that said Letters Patent is hereby corrected as shown below:

Column 9, line 57 change "engine" to --entire--.

Column 10, line 11 "register" should be --registers--.

Column 10, line 26 "52" should be --152--.

Column 11, line 5 "rest" should be --reset--.

Column 14, line 62 "intructions" should be --instructions--.

Column 17, line 23 "present" should be --prevent--.

Column 22, line 47 "emdodiment" should be --embodiment--.

Signed and Sealed this

Eighteenth Day of May 1982

[SEAL]

Attest:

GERALD J. MOSSINGHOFF

Attesting Officer    Commissioner of Patents and Trademarks